Patented Mar. 14, 1939

2,150,885

UNITED STATES PATENT OFFICE 2,150,885

ADDITION PRODUCTS OF SATURATED AND UNSATURATED ETIOCHOLANONES AND THEIR DERIVATIVES AND A METHOD OF PRODUCING THE SAME

Walter Schoeller, Berlin-Westend, and Arthur Serini, Berlin, Germany, assignors to Schering Aktiengesellschaft, Berlin, Germany, a corporation of Germany No Drawing. Application January 11, 1936, Serial No. 58,754. Renewed January 21, 1939. In Germany January 12, 1935

15 Claims. (Cl. 260—397)

This invention relates to addition products of saturated and unsaturated etiocholanones and their derivatives and more particularly to cyanohydrines of saturated and unsaturated etiocholanones and their derivatives and a method of producing the same.

One object of this invention is the manufacture of valuable intermediate products of the cyclopentano polyhydro phenanthrene series that contain at the carbon atom 17 a cyano and a hydroxy group and correspond to the structural formula

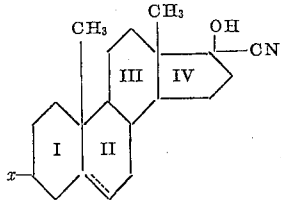

wherein $x$ represents the OH-group or a group which upon hydrolysis or saponification can be reconverted into the hydroxy group, such as the ether, the ester, halogen and the like groups, while the dotted line in ring 2 indicates the position of a double bond in the unsaturated compounds.

As starting material there may be used not only the saturated etiocholanones, such as the male sex hormone, androsterone, of the general formula $C_{19}H_{30}O_2$ or its isomers as they may be obtained, for instance, by oxidation of saturated sterols, but also unsaturated etiocholanones, such as the dehydroandrosterone of the general formula $C_{19}H_{28}O_2$, a compound that contains a double bond in ring 2, but otherwise corresponds to the male sex hormone in its chemical configuration, as well as isomers of this product.

Instead of using the free hydroxy ketones, the androstanolones and androstenolones, as starting materials there may be employed likewise derivatives of these hydroxy ketones that contain a substituent, such as an alkoxy-, O-acyl, halogen or the like group, at the carbon atom 3.

The reaction involved in the present invention takes place according to the following equation

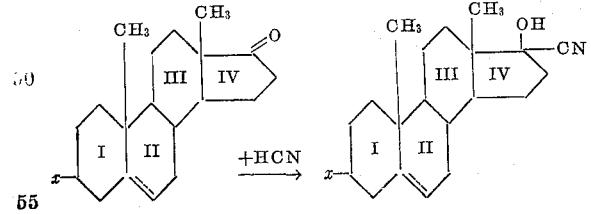

and may be illustrated by the examples given hereinafter without limiting the invention to them:

Example 1

0.5 gram of dehydroandrosterone of the melting point 148° C. are heated with 2 grams of anhydrous hydrocyanic acid in a closed tube for 3 hours to 50° C. Thereafter the hydrocyanic acid that has not reacted, is evaporated and the residue, the cyanohydrin of dehydroandrosterone, is recrystallized from glacial acetic acid. The melting point of this cyanohydrin is at about 221° C. The yield amounts to 70–80%.

Example 2

0.5 gram of the acetate of the dehydroandrosterone, have a melting point of 168° C. are reacted with hydrocyanic acid in the same manner as described in Example 1. Thereby as condensation product the cyanohydrin of the acetate of dehydroandrosterone is obtained.

Example 3

0.5 gram of transandrostanolone of the melting point 172° C. are treated with hydrocyanic acid according to Example 1. Thereby the cyanohydrin of transandrosterone is produced.

In the above given examples many changes and variations may be made by those skilled in the art. Thus, in place of compounds in which the hydroxyl group is free or is substituted by the O-acetyl group, substances may be used as starting materials in which the hydroxy group is replaced, for instance, by the O-benzoyl, the O-succinyl, the O-phthalyl, or any other O-acyl group, by the methoxy-, ethoxy-, or any other alkyloxy group or by an aryloxy group, or by other substituents that can be replaced by the hydroxy group.

Instead of heating the starting material with hydrocyanic acid in a closed tube one may also proceed in such a manner that the solution of the ketone in ether or another water-immiscible solvent is placed above potassium cyanide, whereupon concentrated hydrochloric acid is allowed to run very slowly while cooling into the solution. One may also introduce dry hydrochloric acid gas into the mixture.

Another method of producing cyanohydrines whereby it is possible to work with an aqueous solution consists in shaking the starting material or mixtures containing the same with concentrated sodium bisulfite solution, whereupon the addition products obtained thereby and preferably separated from impurities, are reacted with aqueous concentrated solutions of cyanides. Other methods of producing cyanohydrines as they are known to the art may likewise be employed.

The amount of the various agents and the type and the amount of the solvents used as well as of the reaction conditions, such as temperature, duration of reaction, and the like may be varied within the limits known to those skilled in the art. The products obtained may be purified by fractional and/or repeated crystallization, distillation, sublimation, or by any other suitable method.

The progress achieved by the present invention consists in that valuable products are obtained that can be used as intermediate products for the manufacture of physiologically active compounds, such as etiocholanic acids and the like.

What we claim is:

1. A method for the production of cyanohydrines of saturated and unsaturated ketones of the etiocholane series and their derivatives, comprising reacting said starting materials with hydrocyanic acid.

2. A method according to claim 1, wherein an androstanolone of the general formula $C_{19}H_{30}O_2$ is used as starting materials.

3. A method according to claim 1, wherein androstenolones of the general formula $C_{19}H_{28}O_2$ are used as starting materials.

4. A method for the production of cyanohydrines of derivatives of saturated and unsaturated ketones of the etiocholane series, comprising subjecting etiocholanones having a substituent at the carbon atom 3 of the group consisting of the hydroxy group and groups that on hydrolysis can be replaced by the hydroxy group, to the action of hydrocyanic acid.

5. A method for the production of cyanohydrines of saturated and unsaturated ketones of the etiocholane series, comprising subjecting etiocholanone compounds of the general formula $C_{19}H_nO(X)$, wherein $n$ indicates 27 or 29 and $X$ is a member of the group consisting of the OH-group and groups that upon hydrolysis are replaced by the OH-group, to the action of hydrocyanic acid.

6. A method for the production of cyanohydrines of ketones of the etiocholane series, comprising subjecting etiocholanone compounds of the structural formula

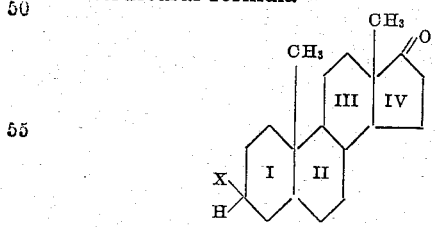

wherein $X$ is a member of the group consisting of the OH-group and groups that upon hydrolysis are replaced by the OH-group to the action of hydrocyanic acid.

7. A method for the production of cyanohydrines of ketones of the etiocholane series, comprising subjecting etiocholanone compounds of the structural formula

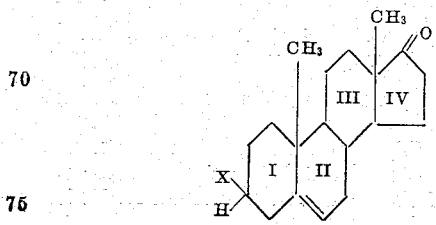

wherein $X$ is a member of the group consisting of the OH-group and groups that upon hydrolysis are replaced by the OH-group to the action of hydrocyanic acid.

8. A cyanohydrin of the etiocholanone series, having the general formula $C_{19}H_n(OH)(CN)(X)$, wherein $n$ indicates 27 or 29 and $X$ is a member of the group consisting of the hydroxy group and groups that upon hydrolysis are replaced by the hydroxy group.

9. A cyanohydrin of the androstanolone series, having the general formula $C_{19}H_{29}(OH)(CN)(X)$ and the structural formula

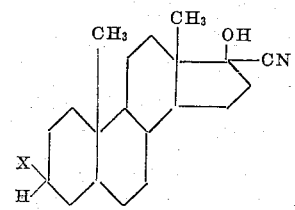

wherein $X$ indicates a member of the group consisting of the hydroxy group and groups that upon hydrolysis are replaced by the hydroxy group.

10. A cyanohydrin of the androstenolone series, having the general formula $C_{19}H_{27}(OH)(CN)(X)$ corresponding to the following structural formula

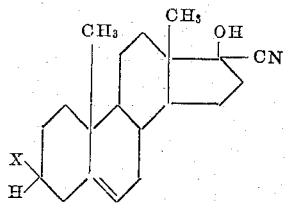

wherein $X$ indicates a member of the group consisting of the hydroxy group and groups that upon hydrolysis are replaced by the hydroxy group.

11. A cyanohydrin of dehydroandrosterone of the general formula $C_{19}H_{27}(OH)_2CN$ corresponding to the following structural formula

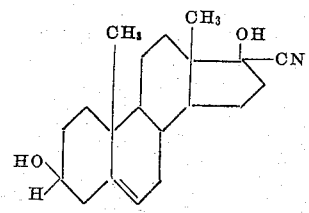

said cyanohydrin having the melting point of about 184° C.

12. The method according to claim 1, wherein substances yielding hydrocyanic acid are employed.

13. The method according to claim 1, wherein a cyanide is employed in the presence of an acid-reacting substance.

14. The method according to claim 1, wherein a cyanide and an acid are employed.

15. The method according to claim 1, wherein the sodium bisulfite compound of the ketone is reacted with a cyanide.

WALTER SCHOELLER.
ARTHUR SERINI.